US012664997B2

(12) United States Patent
Etayo et al.

(10) Patent No.: US 12,664,997 B2
(45) Date of Patent: Jun. 23, 2026

(54) AUDIO SIGNAL QUALITY SCORES

(71) Applicant: Hewlett-Packard Development Company, L.P., Spring, TX (US)

(72) Inventors: Edward Etayo, Spring, TX (US); Hui Leng Lim, Spring, TX (US); Peter Siyuan Zhang, Spring, TX (US)

(73) Assignee: Hewlet-Packard Development Company, L.P., Spring, TX (US)

( * ) Notice: Subject to any disclaimer, the term of this patent is extended or adjusted under 35 U.S.C. 154(b) by 268 days.

(21) Appl. No.: 18/560,656

(22) PCT Filed: Jun. 16, 2021

(86) PCT No.: PCT/US2021/037648
§ 371 (c)(1),
(2) Date: Nov. 13, 2023

(87) PCT Pub. No.: WO2022/265629
PCT Pub. Date: Dec. 22, 2022

(65) Prior Publication Data
US 2024/0257826 A1 Aug. 1, 2024

(51) Int. Cl.
*G10L 25/60* (2013.01)
*G10L 25/51* (2013.01)

(52) U.S. Cl.
CPC .................................... *G10L 25/60* (2013.01)

(58) Field of Classification Search
CPC ................................ G10L 25/60; G10L 25/51
USPC ............................................... 381/56, 58, 77
See application file for complete search history.

(56) References Cited

U.S. PATENT DOCUMENTS

| | | | | |
|---|---|---|---|---|
| 6,985,559 | B2 | 1/2006 | Hardy | |
| 7,194,364 | B1 | 3/2007 | Stanley | |
| 8,488,460 | B2 | 7/2013 | Holm-Oste et al. | |
| 10,581,664 | B1 | 3/2020 | Peng et al. | |
| 2004/0005065 | A1* | 1/2004 | Griesinger | G01V 1/001 381/17 |
| 2010/0305964 | A1 | 12/2010 | Eddy et al. | |
| 2013/0148525 | A1 | 6/2013 | Cuadra Sánchez et al. | |
| 2015/0221321 | A1* | 8/2015 | Christian | G10L 25/48 700/94 |
| 2018/0262433 | A1 | 9/2018 | Ouyang et al. | |
| 2018/0324194 | A1 | 11/2018 | Nakanelua et al. | |
| 2019/0287550 | A1* | 9/2019 | Lim | G10L 25/30 |

(Continued)

FOREIGN PATENT DOCUMENTS

| | | | |
|---|---|---|---|
| CN | 107483879 | A | 12/2017 |
| WO | 2005/062077 | A1 | 7/2005 |

*Primary Examiner* — Thjuan K Addy
(74) *Attorney, Agent, or Firm* — Quarles & Brady LLP

(57) ABSTRACT

An electronic device includes a display device, an audio input device to receive an audio signal, and a processor coupled to the audio input device and the display device. The processor is to detect discrete audio events in the audio signal, calculate a quality score for the audio signal, the quality score based on a running average over a time period, wherein the running average is based on a number of the discrete audio events of the audio signal detected during the time period and disruption scores associated with the discrete audio events, cause the display device to display the quality score, and cause the display device to display information about the discrete audio events having disruption scores exceeding a threshold.

18 Claims, 5 Drawing Sheets

(56) References Cited

U.S. PATENT DOCUMENTS

| | | | |
|---|---|---|---|
| 2020/0066257 | A1 | 2/2020 | Smith et al. |
| 2020/0112600 | A1 | 4/2020 | Hodgkinson et al. |
| 2020/0184987 | A1 | 6/2020 | Kupryjanow et al. |
| 2020/0286504 | A1 | 9/2020 | Seetharaman et al. |
| 2020/0412975 | A1* | 12/2020 | Al Majid ................ G10L 25/60 |

* cited by examiner

AUDIO SIGNAL QUALITY SCORES

BACKGROUND

Electronic devices such as desktops, laptops, notebooks, tablets, and smartphones include audio input devices (e.g., microphones). An audio input device detects an audio signal in a physical environment of an electronic device (e.g., an area in which the electronic device is utilized). The electronic device may transmit the processed audio signals to listeners utilizing other electronic devices.

BRIEF DESCRIPTION OF THE DRAWINGS

Various examples are described below referring to the following figures.

DETAILED DESCRIPTION

Figure 1:
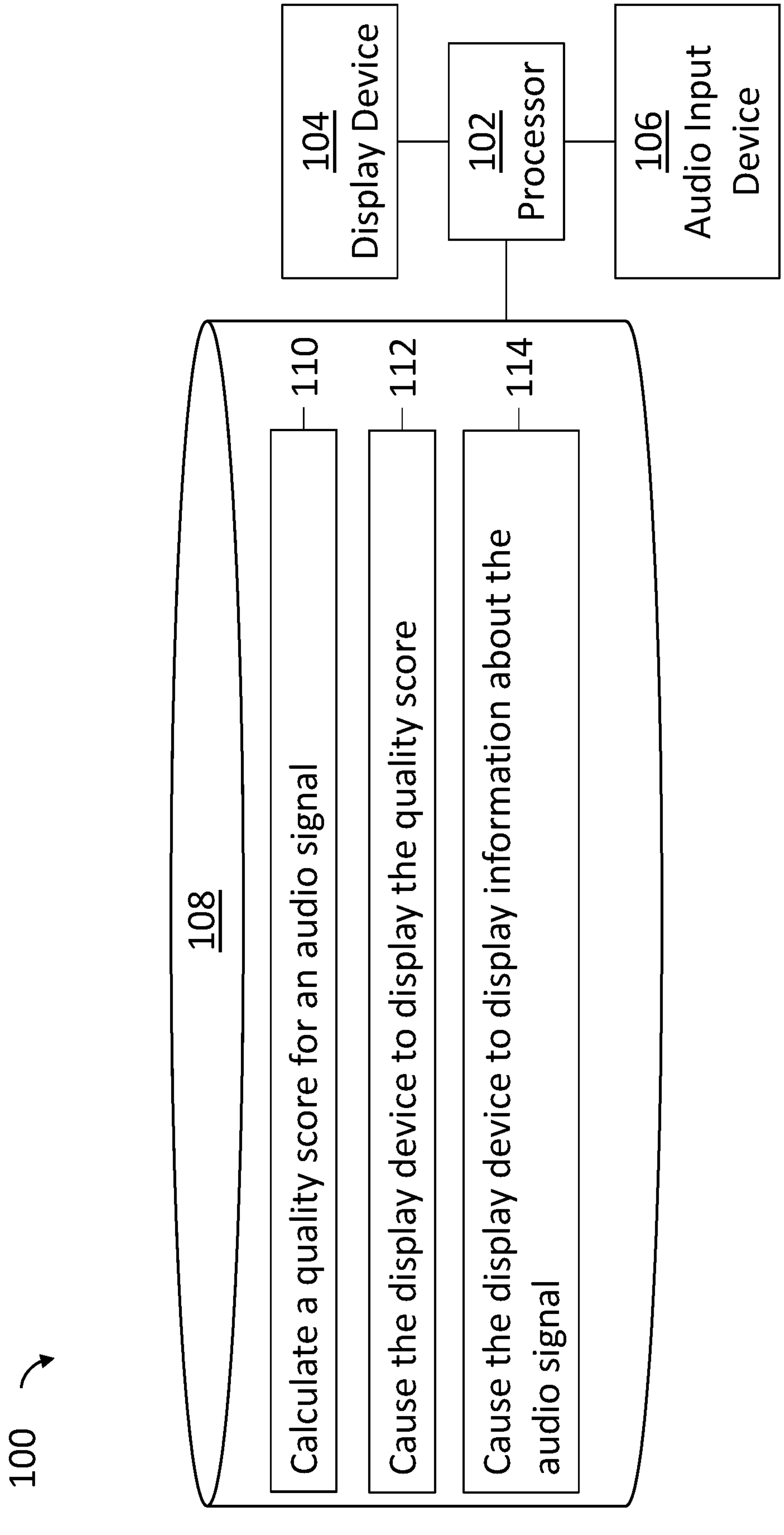
FIG. 1 is a schematic diagram of an electronic device for determining audio signal quality scores, in accordance with various examples.

As described above, electronic devices such as desktops, laptops, notebooks, tablets, and smartphones include audio input devices for detecting an audio signal in a physical environment. The electronic device may process the audio signal to correct audio events that are recorded by the audio input device. Audio events are distortions of sound. The distortions may be recorded from the physical environment or introduced by the processing of the audio signal. The audio events may include echoes, whispers, shouts, feedback, or background noises such as lawnmowers, air conditioners, barking dogs, or ringing phones. The electronic device may correct audio events by compensating for the audio event within the processed audio signal utilizing techniques such as noise cancelling, noise reduction, signal enhancement or other suitable audio filtering techniques. The processed audio signals may be transmitted to other electronic devices during use of a videoconferencing application (e.g., machine-readable instructions that allow the user to communicate visually and verbally with listeners of other electronic devices), for instance. However, in some instances, the processing does not correct an audio event of the audio signal and the user is unaware that the transmitted audio signal includes the audio event. In other instances, the user detects an audio event occurring within the physical environment and is uncertain whether the transmitted audio signal includes the audio event.

This description describes examples of an electronic device that displays information about a quality score of an audio signal so that the user is aware of audio events recorded by the audio signal and whether the recorded audio events are processed or transmitted. The quality score is a perceived quality of the audio signal. The quality score aggregates audio events of the audio signal during a time period and determines an overall perceived effect of the audio events on the audio signal for that time period. In some examples, the quality score may be based on a scale of "good," "moderate," or "bad." In other examples, the quality score may be based on an alphanumeric scale such as A to F, 1 to 10, or 0 to 100. A "good" quality score is relative to a "bad" quality score. For example, a lower value on a scale may represent a "good" quality score and a higher value on the scale may represent a "bad" quality score. In another example, a higher value on the scale may represent a "good" quality score and a lower value on the scale may represent a "bad" quality score.

To determine the quality score, the electronic device may assign an audio event a disruption score. The disruption score is a numerical value that indicates a severity of the audio event. The severity of the audio event is a measure of how disruptive the audio event may be perceived to be by a user. The measurement of the severity may be based on a number of occurrences of the audio event, a duration of the audio event, a power level of the audio event, or a combination thereof. In some examples, the disruption score may be based on a type of disruption of the audio event. The type of disruption may be determined by utilizing categories (e.g., an aggregation of audio events having an equivalent severity), by comparing the audio event to audio events of a data structure (e.g., table, database) stored on the electronic device, utilizing a machine learning technique (e.g., linear regression, decision trees, naïve Bayes, k-Nearest Neighbors (kNN)), or a combination thereof.

The electronic device calculates a quality score for the audio signal utilizing a running, or moving, average. The running average is based on a number of audio events of the audio signal received during the time period and disruption scores associated with the audio events. The result of the running average is compared to a scale of quality scores to determine the quality score. The electronic device displays the quality score and information on the audio events associated with the quality score. The information may include audio events that have disruption scores that exceed a threshold or that have certain types of disruptions. The threshold may be based on a type of disruption or a value of the scale of the quality score, for example.

By displaying the quality score and information about audio events of an audio signal, the user experience is improved because the user has real-time awareness about what listeners are receiving as an audio signal from the user. In some examples, the real-time awareness enables the user to refrain from interrupting a listener to ask about a perceived quality of the audio signal, thereby improving the user and the listener experiences. In various examples, the user may be able to take corrective action (e.g., adjusting an audio filtering setting, removing a cause of background noise, adjusting a speech volume) to improve the audio signal before transmission to a listener, thereby improving the listener experience.

In an example in accordance with the present description, a non-transitory machine-readable medium is provided. The non-transitory machine-readable medium stores machine-readable instructions. When executed by a processor of an electronic device, the machine-readable instructions cause the processor to receive an audio signal over a time period, to detect audio events in the audio signal, to assign a distinct disruption score to each of the audio events, to calculate a running average of the disruption scores, and to cause a display device to display a quality score based on the running average, where the quality score is indicative of a perceived quality of the audio signal.

In another example in accordance with the present description, an electronic device is provided. The electronic device comprises a display device, an audio input device to receive an audio signal, and a processor coupled to the audio input device and the display device. The processor is to calculate a quality score for the audio signal, where the quality score is based on a running average over a time period and where the running average is based on a number of audio events of the audio signal received during the time period and disruption scores associated with the audio events. The processor is to cause the display device to display the quality score and cause the display device to display information about the audio events having disruption scores exceeding a threshold.

In another example in accordance with the present description, an electronic device is provided. The electronic device comprises an audio input device to receive an audio signal and a processor coupled to the audio input device. The processor is to determine a type of disruption of an audio event of the audio signal, assign a disruption score based on the type of disruption, and update a running average over a time period, where the running average is based on a number of audio events received during the time period and disruption scores associated with the audio events. The processor is to cause a display device to display a quality score based on the running average and cause the display device to display information about the types of disruption of the audio events.

Referring now to FIG. 1, a schematic diagram of an electronic device 100 for determining audio signal quality scores is depicted in accordance with various examples. The electronic device 100 comprises a processor 102, a display device 104, an audio input device 106, and a storage device 108. The electronic device 100 may be a desktop, a laptop, a notebook, a tablet, a smartphone, or other electronic computing device having audio input devices. The processor 102 may be a microprocessor, a microcomputer, a microcontroller, a programmable integrated circuit, a programmable gate array, or other suitable device for controlling operations of the electronic device 100. The display device 104 may be any suitable display device for displaying data generated by the electronic device 100. The audio input device 106 may be a microphone or any suitable device for recording sound. The storage device 108 may be a hard drive, a solid-state drive (SSD), flash memory, random access memory (RAM), or other suitable memory device.

In some examples, the processor 102 couples to the display device 104, the audio input device 106, and the storage device 108. The storage device 108 may store machine-readable instructions that, when executed by the processor 102, may cause the processor 102 to perform some or all of the actions attributed herein to the processor 102. The machine-readable instructions may be the machine-readable instructions 110, 112, 114.

In various examples, when executed by the processor 102, the machine-readable instructions 110, 112, 114 cause the processor 102 to determine audio signal quality scores. The machine-readable instruction 110 causes the processor 102 to calculate a quality score for an audio signal. As described above, the quality score utilizes a running average that is based on a number of audio events of the audio signal received during a time period and disruption scores associated with the audio events. For example, during a 10 second (sec.) time period, the processor 102 may record an audio signal, determine there are 2 audio events having disruption scores of 5 and 10, respectively, and calculate a simple running average for the 10 sec. audio signal to be 7.5. The machine-readable instruction 112 causes the processor 102 to cause the display device 104 to display the quality score. For example, based on the running average of 7.5, the processor 102 may determine a quality score of "good" utilizing a scale of quality scores having values from 0 to 100. The machine-readable instruction 114 causes the processor 102 to cause the display device 104 to display information about the audio signal. For example, the processor 102 may cause the display device 104 to display each audio event and the distinct disruption score for the audio event.

In other examples, the processor 102 may calculate the quality score utilizing an exponential running average, or an exponentially weighted moving average. For example, the processor 102 may add 1 to a number of time periods that have elapsed to obtain a divisor. The processor 102 may divide 2 by the divisor to obtain a multiplier. The processor 102 may multiply the multiplier by a disruption score of a last (e.g., most recent) audio event of the current time period to obtain a first additive value. The processor 102 may subtract the multiplier from 1. The processor 102 may multiply the result of the subtraction by an exponential running average of a time period that elapsed immediately prior to the current time period to obtain a second additive value. The processor 102 may sum the first and the second additive values to calculate the exponential running average for the current time period.

In various examples, the processor 102 assigns an audio event a disruption score that indicates a perceived severity of the audio event. The perceived severity of the audio event may be a categorized based on a scale of the quality score. For example, the perceived severity may be "high" based on a "bad" quality score, "moderate" based on a "moderate" quality score, or "low" based on a "good" quality score. The severity of the audio event may be based on an amplitude (e.g., power level) of the audio event compared to an amplitude of the audio signal before and after the audio event. For example, the processor 102 may assign a disruption score indicating a "high" degree of severity of an audio event responsive to an amplitude of the audio event falling between first and second values (e.g., 80 decibels (dBs) and 120 dBs) or responsive to the amplitude of the audio event exceeding an amplitude of the audio signal before and after the audio event by a factor (e.g., 1.25, 2, 3) or by a value (e.g., 10 decibels (dBs), 25 dBs, 40 dBs). For example, conversational speech may be 60 dB, a whisper may be 30 dB, and a shout may be 90 dB. Based on higher decibel levels causing more damage to hearing, the severity of the shout may be categorized as "high" and may be assigned a higher disruption score than the whisper. The processor 102 may categorize the whisper as "low" severity. The perceived severity of the audio event may be based on a duration of the audio event compared to a duration of the time period of the running average. For example, the processor 102 may assign a disruption score indicating a "high" degree of severity of an audio event responsive to a duration of the audio event exceeding a duration of the time period by a factor (e.g., 0.05, 0.1, 0.5) or by a value (e.g., 3 sec., 5 sec., 10 sec.). The perceived severity of the audio event may be based on a number of past occurrences of an equivalent audio event during the time period. For example, the processor 102 may assign a disruption score indicating a high degree of severity of an audio event responsive to the audio event occurring a number of occurrences (e.g., 1, 2, 4) during the time period.

In some examples, the processor 102 causes the display device 104 to display information about the audio signal that includes information about the audio events having disruption scores exceeding a threshold. The threshold may be based on the quality score. For example, responsive to a "good," "moderate," or "bad" scale of the quality scores, the threshold may be based on disruption scores having values categorized as "good," "moderate," or "bad." Disruption scores having values between 0 and 10 may be categorized as "good," disruption scores having values between 11 and 50 may be categorized as "moderate," and disruption scores having values equal to or greater than 51 may be categorized as "bad." In response to the threshold having a value of "moderate," the electronic device 100 causes the display device 104 to display the audio events having disruption scores that exceed the upper value of the "moderate" category (e.g., are greater than 50). In another example, responsive to a scale of the quality scores having values between 0 to 100, where lower values are worse relative to higher values, the threshold may be selected by a user to equal 51. The electronic device 100 causes the display device 104 to display the audio events having disruption scores exceeding the threshold of 51 (e.g., values below 51). By displaying the quality score and information about audio events of an audio signal, the user experience is improved because the user has real-time awareness about what listeners are receiving as an audio signal from the user. By utilizing a scale for the quality score, the user experience is improved because the scale provides an easy to understand summary of the real-time experience of the listener. The real-time awareness enables the user to refrain from interrupting a listener to ask about a perceived quality of the audio signal, thereby improving the user and the listener experiences.

Figure 2:
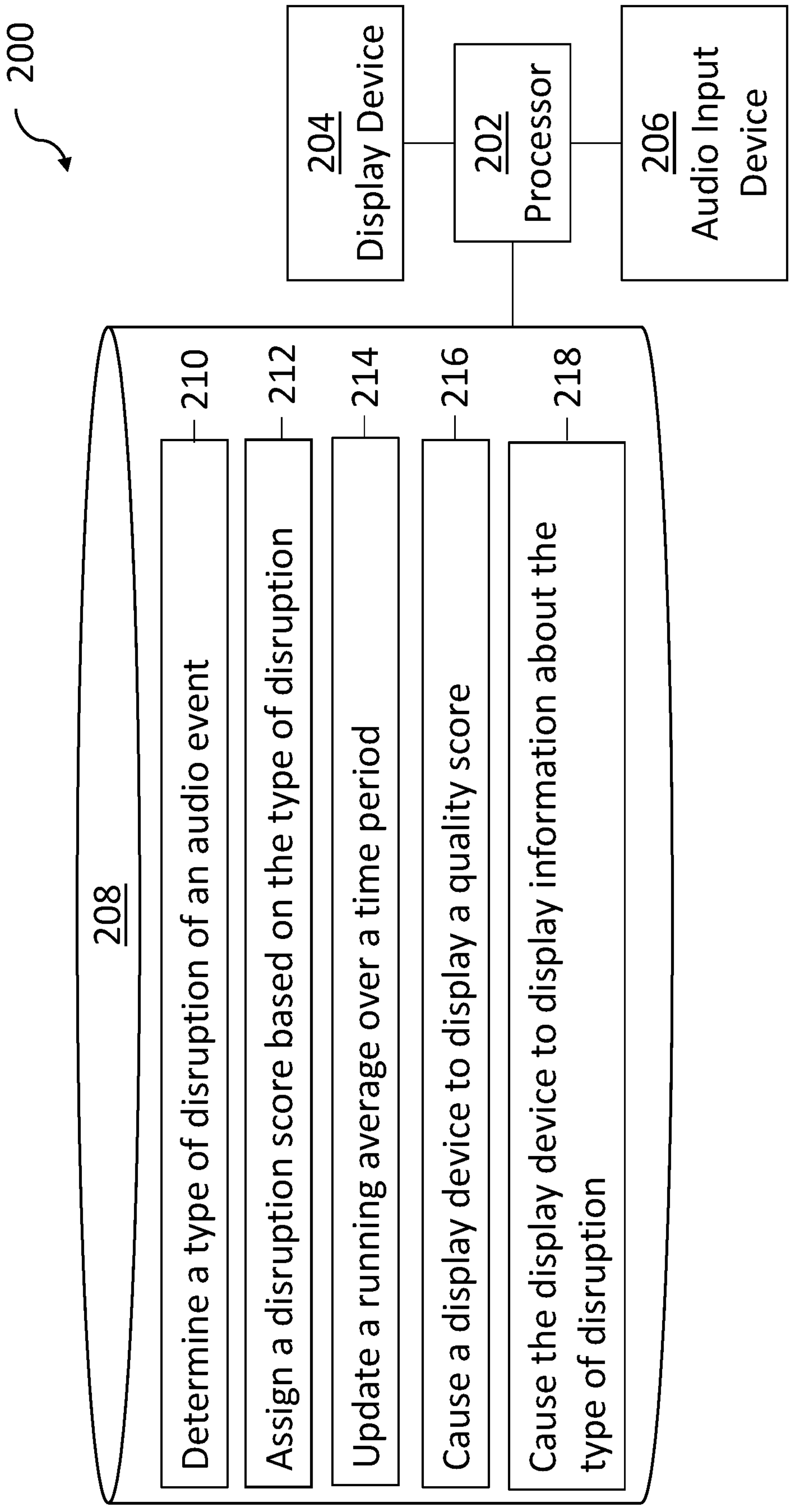
FIG. 2 is a schematic diagram of an electronic device for determining audio signal quality scores, in accordance with various examples.

Referring now to FIG. 2, a schematic diagram of an electronic device 200 for determining audio signal quality scores is depicted in accordance with various examples. The electronic device 200 comprises a processor 202, a display device 204, an audio input device 206, and a storage device 208. The electronic device 200 may be the electronic device 100. The display device 204 may be the display device 104. The audio input device 206 may be the audio input device 106.

In some examples, the processor 202 couples to the display device 204, the audio input device 206, and the storage device 208. The storage device 208 may store machine-readable instructions that, when executed by the processor 202, may cause the processor 202 to perform some or all of the actions attributed herein to the processor 202. The machine-readable instructions may be the machine-readable instructions 210, 212, 214, 216, 218.

In various examples, when executed by the processor 202, the machine-readable instructions 210, 212, 214, 216, 218 cause the processor 202 to determine audio signal quality scores. The machine-readable instruction 210 causes the processor 202 to determine a type of disruption of an audio event. The processor 202 may determine the type of disruption of the audio event by utilizing categories, by comparing the audio event to audio events of a data structure stored on the storage device 208, by utilizing a machine learning technique, or a combination thereof. The machine-readable instruction 212 causes the processor 202 to assign a disruption score based on the type of disruption. The machine-readable instruction 214 causes the processor 202 to update a running average over a time period. As described above with respect to FIG. 1, the running average over a time period may be a simple running average, an exponential running average, or some other suitable running average calculation. The machine-readable instruction 216 causes the processor 202 to cause the display device 104 to display a quality score based on the running average. The machine-readable instruction 218 causes the processor 202 to cause the display device 204 to display information about the type of disruption of the audio event.

In some examples, the type of disruption is a category (e.g., minor, major, corrected). For example, responsive to the processor 202 detecting an audio event of the audio signal and compensating for the audio event during processing of the audio signal, the processor 202 may assign a category of "corrected" to the audio event. The processor 202 may determine whether a type of disruption for an audio event is "minor" or "major" based on a perceived severity of the audio event. As described above with respect to FIG. 1, the perceived severity of the audio event may be based on an amplitude of the audio event compared to an amplitude of the audio signal before and after the audio event, may be based on a duration of the audio event compared to a duration of the time period of the running average, or may be based on a number of past occurrences of equivalent audio events during the time period. For example, responsive to an amplitude of an audio event exceeding a power level, the processor 202 may assign a category of "major" to the audio event. Responsive to a duration of the audio event falling below a factor of a duration of the time period, the processor 202 may assign a category of "minor" to the audio event. Based on the category, the processor 202 may assign a disruption score to an audio event. For example, the processor 202 may utilize a scale of quality scores having values between 1 and 10, where 1 indicates a "bad" quality score and 10 indicates a "good" quality score. The processor 202 may assign a "corrected" audio event a disruption score of 10, may assign a "minor" audio event a disruption score between 5 and 9, and may assign a "major" audio event a disruption score between 1 and 4.

In various examples, responsive to the processor 202 detecting an audio event of the audio signal and compensating for the audio event during processing of the audio signal, the processor 202 may adjust a category of the audio event. For example, the processor 202 may determine the audio event has a first category of "major" and a first disruption score prior to processing of the audio signal. Responsive to the processor 202 partially compensating for the audio event during processing of the audio signal, the processor 202 may assign a second category of "minor" to the audio event and a second disruption score. In other examples, responsive to the processor 202 detecting an audio event of the audio signal and partially compensating for the audio event during processing of the audio signal, the processor 202 may adjust a disruption score of the audio event to a lower value within a range of disruption scores associated with a category of the audio event. Prior to processing of the audio signal, the processor 202 may determine an audio event of the audio signal has a category of "minor" and a disruption score that indicates a higher disruption score in a range of disruption scores associated with the "minor" category. For example, the processor 202 may assign a "minor" audio event having a range of disruption scores between 6 and 11 a first disruption score of 10 to indicate that the "minor" audio event is perceived as more disruptive (e.g., having a higher severity) than other "minor" audio events. Responsive to the processor 202 partially compensating for the audio event during processing of the audio signal, the processor 202 may assign the audio event a second disruption score that is lower than the first disruption score in the "minor" category. For example, the processor 202 may assign the "minor" audio event a disruption score of 7 to indicate that the "minor" audio event is partially corrected. In various examples, the processor 202 may recalculate the running average by replacing the first disruption score with the second disruption score. The processor 202 may cause the display device 204 to recalculate the quality score based on the recalculation of the running average. The processor 202 may cause the display device 204 to display that the audio event is "partially corrected."

In other examples, the type of disruption is determined by comparing the audio event to audio events of a data structure stored on a storage device. The data structure may be stored on the storage device 208, for example. Each audio event of the data structure has a corresponding disruption score. For example, the data structure may include a barking dog audio event having a disruption score of 5, a ringing phone audio event having a disruption score of 2, a beeping smoke alarm audio event having a disruption score of 7, and an air conditioner audio event having a disruption score of 4. During processing of the audio signal, the processor 202 may determine an audio event of the audio signal is the equivalent an audio event of the data structure. The processor 202 may assign the audio event the disruption score corresponding to the audio event of the data structure. For example, during processing of the audio signal, the processor 202 may determine an audio event is equivalent to the barking dog audio event of the data structure and assign the audio event the disruption score of 5.

In various examples, the disruption score is determined utilizing a machine learning technique. For example, utilizing a machine learning technique, the processor 202 may adjust a disruption score of an audio event with each occurrence of the audio event. The adjustment may be based on a recurring nature of the audio event, based on how frequently the audio event and equivalent audio events are corrected during processing of the audio signal, or based on a duration of the audio event. The processor 202 may assign a first disruption score to an audio event based on a first occurrence of the audio event during a time period. Responsive to the audio event occurring a second time during the time period, the processor 202 may assign a second disruption score to the second occurrence of the audio event that indicates a higher severity. Responsive to the processor 202 correcting a third occurrence of the audio event during the time period, the processor 202 may assign a third disruption score having a value between the first disruption score and the second disruption score. In some examples, the processor 202 may track audio events across multiple time periods and adjust a disruption score of a current audio event based on behavior of past occurrences of audio events equivalent to the current audio event.

In various examples, the processor 202 may utilize a combination of the types of disruption to determine a disruption score for an audio event. For example, an earlier audio event and the more recent audio event may be a siren. The processor 202 may retrieve from a data structure stored on the storage device 208 a disruption score corresponding to a siren audio event. Due to a frequency of occurrence as determined by a machine learning technique, the processor 202 may assign a higher disruption score to the siren audio event than the disruption score corresponding to the siren audio event of the data structure. In some examples, the processor 202 may replace the disruption score corresponding to the siren audio event of the data structure with the higher disruption score.

In various examples, the processor 202 causes the display device 204 to display information about the type of disruption of the audio event. The information about the type of disruption of the audio event may include a category, a disruption score, whether the processor 202 applied any audio filtering techniques to the audio event, or a combination thereof. As described above with respect to FIG. 1, the processor 202 may display information about the audio events having disruption scores exceeding a threshold. In various examples, the threshold may be based on a type of disruption of an audio event. For example, responsive to the types of disruption having categories of "major," "minor," and "corrected" and a threshold of "minor," the processor 202 causes the display device 204 to display the audio events having a category of "minor" or "major."

By displaying the quality score and information about the types of disruptions of audio events of an audio signal, the user experience is improved because the user has real-time awareness about what listeners are receiving as an audio signal from the user. By utilizing a threshold, the user experience is improved because the user can filter the information according to the user's preferences. The real-time awareness enables the user to refrain from interrupting a listener to ask about a perceived quality of the audio signal, thereby improving the user and the listener experiences.

Figure 3:
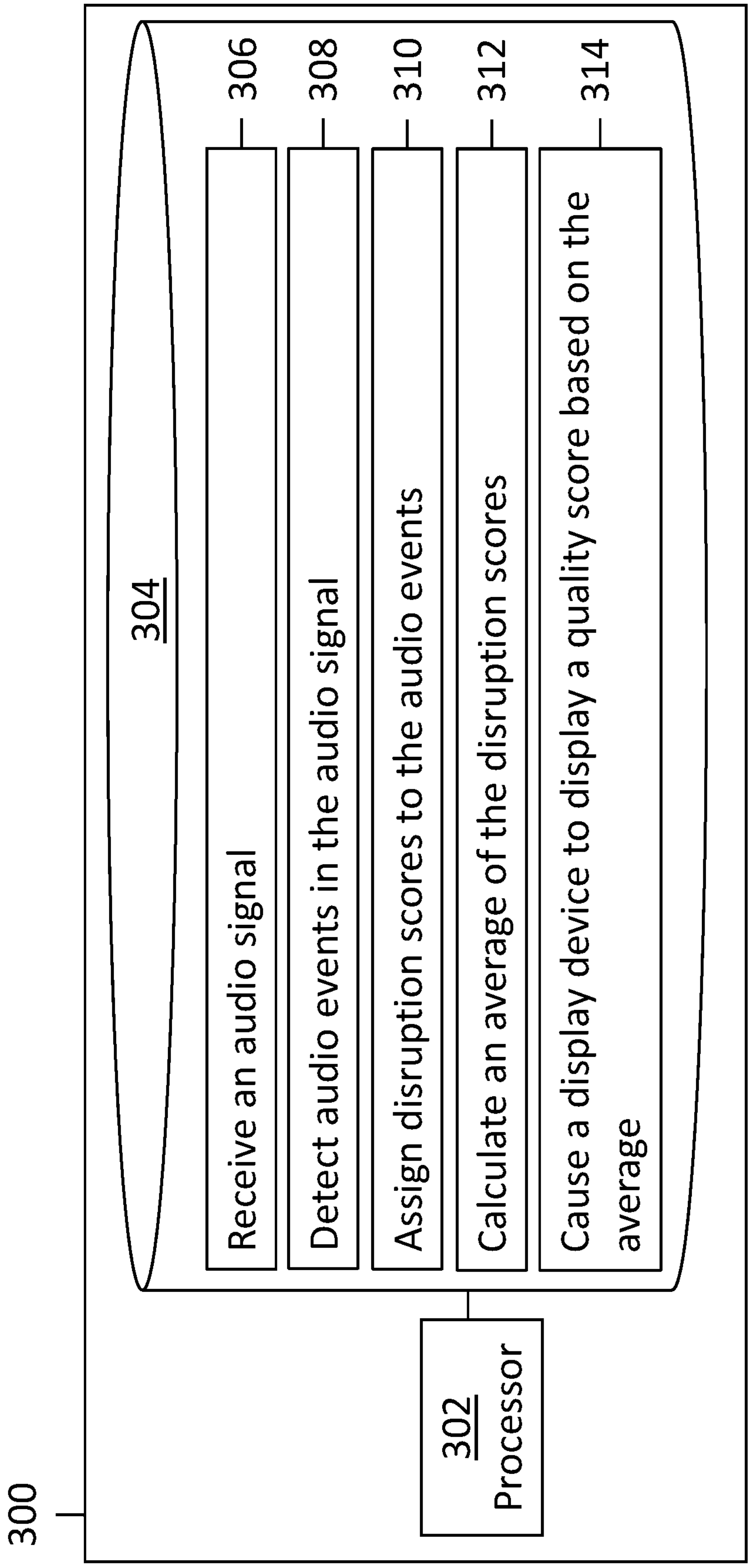
FIG. 3 is a schematic diagram of an electronic device for determining audio signal quality scores, in accordance with various examples.

Referring now to FIG. 3, a schematic diagram of an electronic device 300 for determining audio signal quality scores is depicted in accordance with various examples. The electronic device 300 comprises a processor 302 and the non-transitory machine-readable medium 304. The electronic device 300 may be the electronic device 100, 200. The processor 302 may be the processor 102, 202. The non-transitory machine-readable medium 304 may be the storage device 108, 208. The term "non-transitory" does not encompass transitory propagating signals.

In various examples, the electronic device 300 comprises the processor 302 coupled to the non-transitory machine-readable medium 304. The non-transitory machine-readable medium 304 may store machine-readable instructions. The machine-readable instructions may be the machine-readable instructions 306, 308, 310, 312, 314. The machine-readable instructions 306, 308, 310, 312, 314, when executed by the processor 302, may cause the processor 302 to perform some or all of the actions attributed herein to processor 302.

In various examples, when executed by the processor 302, the machine-readable instructions 306, 308, 310, 312, 314 cause the processor 302 to determine audio signal quality scores. The machine-readable instruction 306 may cause the processor 302 to receive an audio signal. The processor 302 may receive the audio signal via an audio input device (e.g., 106, 206). As described above with respect to FIGS. 1 and 2, the processor 302 may receive the audio signal over a time period. The machine-readable instruction 308 may cause the processor 302 to detect audio events in the audio signal. The processor 302 may detect audio events in the audio signal during processing of the audio signal, for example. The machine-readable instruction 310 may cause the processor 302 to assign disruption scores to the audio events. The processor 302 may assign a distinct disruption score to each of the audio events utilizing the techniques described above with respect to FIGS. 1 and 2, for example. The machine-readable instruction 312 may cause the processor 302 to calculate an average of the disruption scores. As described above with respect to FIGS. 1 and 2, the average may be a running average. The machine-readable instruction 314 may cause the processor 302 to cause a display device to display a quality score based on the average. The display device may be the display device 104, 204, for example.

In some examples, a duration of time may elapse between audio events detected by the processor 302. The processor 302 may create an audio event having a category of "non-event." The processor 302 may assign a disruption score that correlates to a target quality score of "good." The processor 302 may include the disruption score for the audio event in the determination of the quality score. For example, the processor 302 may determine an audio signal having a duration of 10 sec. comprises no audio events. The processor 302 may create an audio event at 2 sec. intervals of the 10 sec. The processor 302 may assign each audio event a disruption score associated with a perceived quality score of "good." For example, utilizing a scale of quality scores having a range of "A" to "F," the processor 302 may assign each audio event a disruption score of "A." The processor 302 calculates the average of the audio events as "A" and determines a quality score of "A."

In some examples, the processor 302 assigns a first audio event having a "corrected" type of disruption a disruption score that is equal to a disruption score of a second audio event having a "non-event" type of disruption. For example, during processing, the processor 302 may correct the audio event by removing the audio event from the audio signal. The perceived quality of the audio signal is as if the audio event was never present in the pre-processed audio signal. Based on the perception, the processor 302 assigns the audio event a disruption score that equals a disruption score of a "non-event" type of disruption. In other examples, the processor 302 assigns the first audio event having a "corrected" type of disruption a higher disruption score than the disruption score of the second audio event having a "non-event" type of disruption. During processing, the processor 302 may correct an audio event and determine the audio event has a high frequency of occurrence. Based on the high frequency of occurrence, for example, the processor 302 assigns the audio event a higher disruption score than a disruption score of "non-event" type of disruption.

Figure 4:
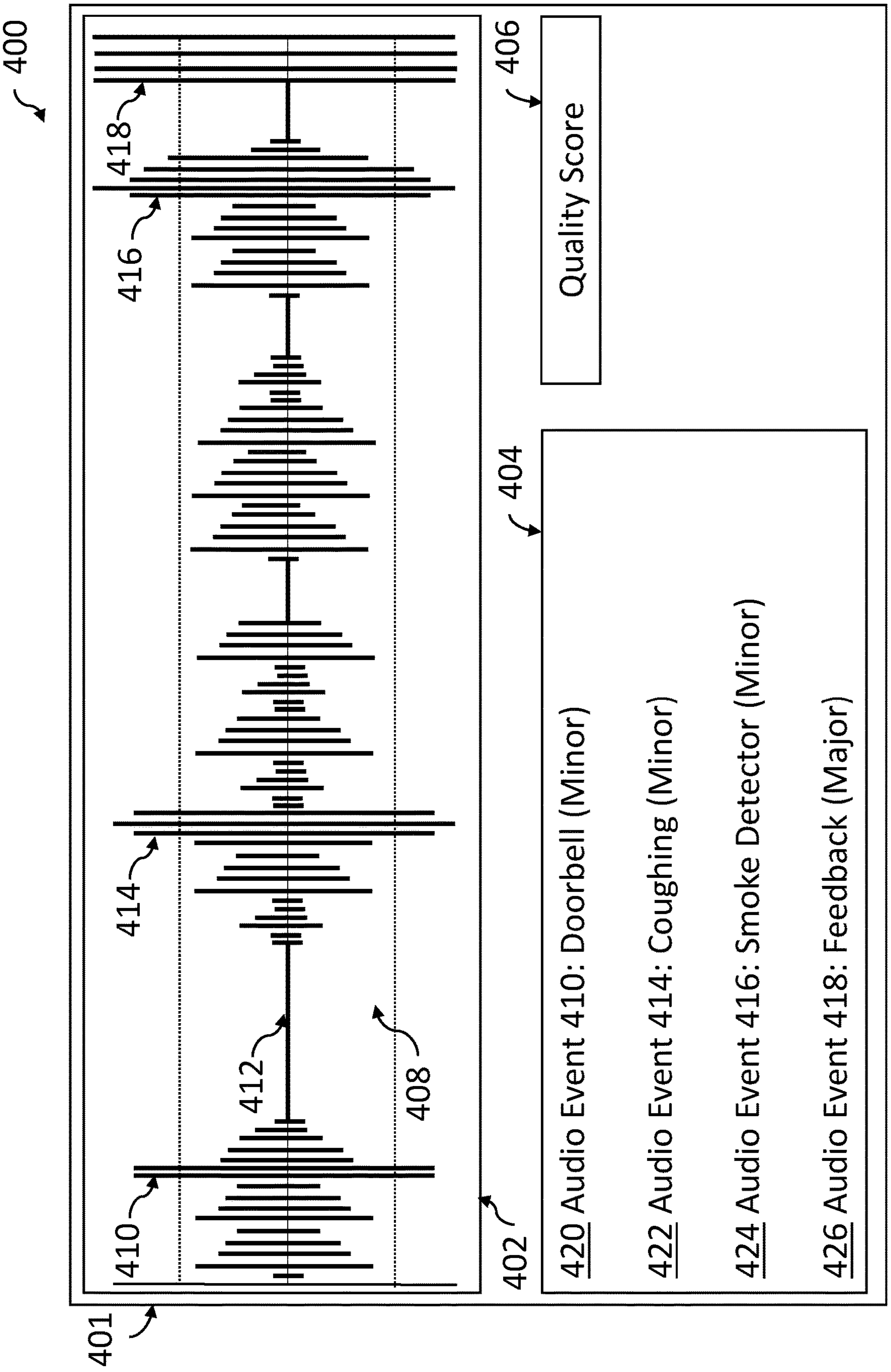
FIG. 4 is an example of a display device displaying an audio signal quality score, in accordance with various examples.

Referring now to FIG. 4, an example of a display device 400 displaying an audio signal quality score is depicted in accordance with various examples. FIG. 4 includes the display device 400, an application window 401, an audio signal window 402, an information window 404, and a quality score window 406. The audio signal window 402 comprises an audio signal 408 having audio events 410, 412, 414, 416, 418. The information window 404 comprises information 420, 422, 424, 426. The display device 400 may be the display device 104, 204, for example.

In various examples, the display device 400 displays the application window 401 in response to machine-readable instructions that, when executed by a processor (e.g., the processor 102, 202, 302), cause the application for determining audio signal quality scores to execute. The application for determining audio signal quality scores may execute in response to a user selection of the application, for example. In another example, the application for determining audio signal quality scores may execute in response to another application (e.g., videoconference application) of the electronic device (e.g., the electronic device 100, 200, 300) executing.

The audio signal window 402 is a real-time display of an audio signal. The audio signal 408 may be the audio signal received by an audio input device or the processed audio signal that is transmitted to a listener. The audio input device may be the audio input device 106, 206, for example. In some examples, the audio signal window 402 may include multiple audio signals. For example, the audio signal window 402 may include the audio signal received by the audio input device and the processed audio signal that is transmitted to the listener.

In some examples, the processor determines that audio events 410, 412, 414, 416, and 418 are audio events. The processor may determine that audio events 410, 414, 416, and 418 are audio events based on an amplitude of the audio event 410, 412, 414, 416, 418 compared to amplitudes of the audio signal 408 before and after each audio event 410, 412, 414, 416, 418, for example. The processor may determine that audio events 412, 414, 416, and 418 are audio events based on a duration of the audio event 412, 414, 416, 418, for example.

In various examples, the display device 400 displays information about the audio events 410, 412, 414, 416, 418 in the information window 404. The information 420 is information about the audio event 410. The information 422 is information about the audio event 414. The information 424 is information about the audio event 416. The information 426 is information about the audio event 418. A threshold may be set to display audio events having a "minor" or "major" type of disruption, for example. The processor may determine audio event 412 is an audio event having a "non-event" type of disruption category. Based on the threshold, information for the audio event 412 is not displayed. The information 420 indicates the audio event 410 is a doorbell type of disruption and a "minor" type of disruption. The information 422 indicates the audio event 414 is a coughing type of disruption and a "minor" type of disruption. The information 424 indicates the audio event 416 is a smoke detector type of disruption and a "minor" type of disruption. The information 426 indicates the audio event 418 is a feedback type of disruption and a "major" type of disruption.

The processor calculates a quality score utilizing the techniques described above with respect to FIGS. 1-3 and causes the display device 400 to display the quality score in the quality score window 406. In some examples, data of the application window 401 may be color coded to demonstrate the relationships between the audio events, the types of disruptions of the audio events, and the scale of the quality score. For example, a "good" quality score in the quality score window 406 may have a first color. Information for "corrected" and "non-event" audio events displayed in the information window 404 may have a same color as the "good" quality score. A "moderate" quality score in the quality score window 406 may be a second color, and information for "minor" audio events displayed in the information window 404 may be a same color as the "moderate" quality score. A "bad" quality score in the quality score window 406 may be a third color, and information for "major" audio events displayed in the information window 404 may be a same color as the "bad" quality score. A color of an audio signal received by an audio input device and displayed in the audio signal window 402 may be a different color than a color of a processed audio signal that is transmitted to the listener and displayed in the audio signal window 402.

Figure 5:
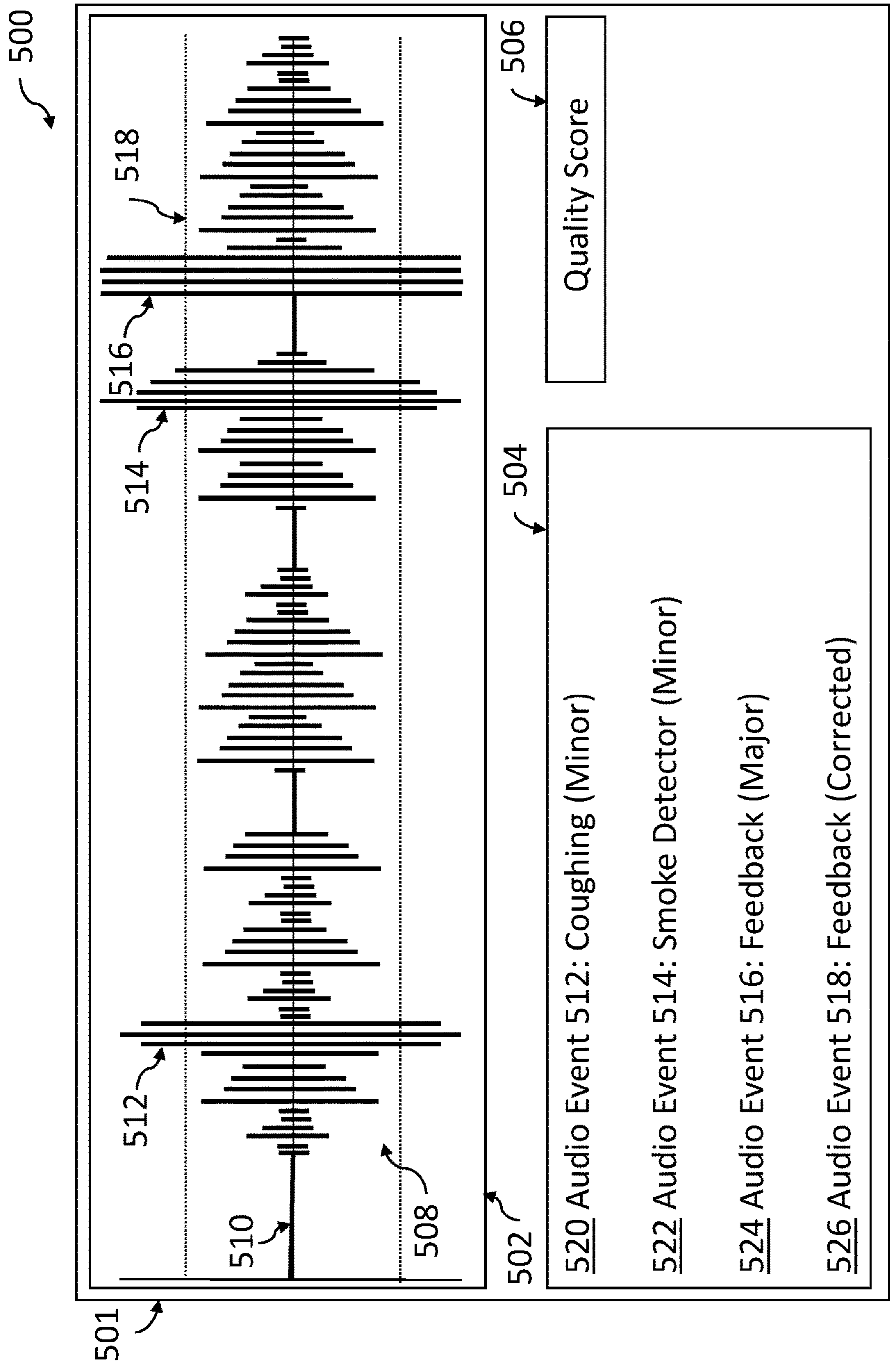
FIG. 5 is an example of a display device displaying an audio signal quality score, in accordance with various examples.

Referring now to FIG. 5, an example of a display device 500 displaying an audio signal quality score is depicted in accordance with various examples. FIG. 5 includes the display device 500, an application window 501, an audio signal window 502, an information window 504, and a quality score window 506. The display device 500 may be the display device 400, for example. The application window 501 may be the application window 401, for example. The audio signal window 502 may be the audio signal window 402, for example. The information window 504 may be the information window 404, for example. The quality score window 506 may be the quality score window 406, for example. The audio signal window 502 comprises an audio signal 508 having audio events 510, 512, 514, 516, 518. The information window 504 comprises information 520, 522, 524, 526.

In some examples, a processor (e.g., the processor 102, 202, 302) determines that audio events 510, 512, 514, 516, and 518 are audio events. The processor may determine that audio events 512, 514, 516, and 518 are audio events based on an amplitude of the audio event 512, 514, 516, 518 compared to amplitudes of the audio signal 508 before and after each audio event 512, 514, 516, 518, for example. The processor may determine that audio events 510, 512, 514, and 516 are audio events based on a duration of the audio event 510, 512, 514, 516, for example. The processor may determine that audio event 518 is an audio event based on a correction of audio event 516, for example.

In various examples, the display device 500 displays information about the audio events 512, 514, 516, 518 in the information window 504. The information 520 is information about the audio event 512. The information 522 is information about the audio event 514. The information 524 is information about the audio event 516. The information 526 is information about the audio event 518. A threshold may be set to display audio events having a "corrected," a "minor," or a "major" type of disruption, for example. The processor may determine the audio event 510 is an audio event having a "non-event" type of disruption category. Based on the threshold, information for the audio event 510 is not displayed. The information 520 indicates the audio event 512 is a coughing type of disruption and a "minor" type of disruption. The information 522 indicates the audio event 514 is a smoke detector type of disruption and a "minor" type of disruption. The information 524 indicates the audio event 516 is a feedback type of disruption and a "major" type of disruption. The information 526 indicates the audio event 518 is a feedback type of disruption and has a "corrected" type of disruption.

In various examples, the audio signal 508 is an audio signal that includes a time period subsequent to the time period for the audio signal 408. For example, the audio events 510, 512, 514, 516 may be the audio events 412, 414, 416, 418. The processor may determine the quality score for the time period of the audio signal 508 by determining a disruption score for the audio event 518 and calculating an exponential running average utilizing the quality score of the audio signal 408. In some examples, prior to calculating the exponential running average, the processor replaces the disruption score of the feedback audio event 516 with a disruption score for the corrected feedback audio event 518. In various examples, the feedback audio event 516 is corrected by a user adjusting an audio filtering setting, adjusting a volume, or adjusting a location of the audio input device. By taking corrective action, the user improves the audio signal before transmission to the listener. The display device 500 displays the quality score in the quality score window 506.

By displaying the quality score and information about audio events of an audio signal as described above with respect to FIGS. 1-5, the user experience is improved because the user has real-time awareness about what listeners are receiving as an audio signal from the user. The user experience is improved because the application for determining quality scores provides an easy to understand summary of the real-time experience of the listener. The real-time awareness enables the user to refrain from interrupting a listener to ask about a perceived quality of the audio signal, thereby improving the user and the listener experiences.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through and indirect connection via other devices, components, and connections. Additionally, the word "or" is used in an inclusive manner. For example, "A or B" means any of the following: "A" alone, "B" alone, or both "A" and "B."

What is claimed is:

1. A non-transitory machine-readable medium storing machine-readable instructions which, when executed by a processor of an electronic device, cause the processor to:
- receive an audio signal over a time period;
- detect discrete audio events in the audio signal;
- assign a distinct disruption score to each of the audio events, wherein the distinct disruption score is a numerical value that indicates a severity of an audio event of the audio events, wherein the severity of the audio event is adjusted based on processing of the audio signal;
- calculate a running average of the disruption scores; and
- cause a display device to display a quality score based on the running average, wherein the quality score is indicative of a perceived quality of the audio signal.

2. The non-transitory machine-readable medium of claim 1, wherein the running average is an exponential running average.

3. The non-transitory machine-readable medium of claim 1, wherein a scale of the quality score includes alphanumeric values.

4. An electronic device, comprising:
- a display device;
- an audio input device to receive an audio signal; and
- a processor coupled to the audio input device and the display device, the processor to:
  - detect discrete audio events in the audio signal;
  - calculate a quality score for the audio signal, the quality score based on a running average over a time period, wherein the running average is based on a number of the discrete audio events of the audio signal detected during the time period and disruption scores associated with the discrete audio events;
  - cause the display device to display the quality score; and
  - cause the display device to display information about the discrete audio events having disruption scores exceeding a threshold.

5. The electronic device of claim 4, wherein the disruption scores are based on an amplitude of the audio event, a duration of the audio event, a number of occurrences of past audio events that are the audio event, or a combination thereof.

6. The electronic device of claim 4, wherein the threshold is based on a type of disruption, a value of a scale of the quality score, or a combination thereof.

7. The electronic device of claim 4, wherein, responsive to the time period having no audio events, the processor is to create an audio event having a disruption score that indicates a target quality score.

8. The electronic device of claim 4, wherein, responsive to the processor correcting an audio event of the number of audio events, the audio event having a first disruption score, the processor is to:

determine a second disruption score of the audio event of the number of audio events;

recalculate the quality score for the audio signal, wherein the second disruption score is to replace the first disruption score; and cause the display device to display the recalculated quality score.

9. An electronic device, comprising:

an audio input device to receive an audio signal; and a processor coupled to the audio input device, the processor to:

detect discrete audio events in the audio signal;

determine a type of disruption of a detected audio event the discrete audio events in the audio signal;

assign a disruption score based on the type of disruption;

update a running average over a time period, wherein the running average is based on a number of the discrete audio events detected during the time period and disruption scores associated with the discrete audio events;

cause a display device to display a quality score based on the running average; and cause the display device to display information about the types of disruption of the audio events.

10. The electronic device of claim 9, wherein the processor is to determine the type of disruption by utilizing categories, by comparing the audio event to audio events of a data structure, by utilizing a machine learning technique, or a combination thereof.

11. The electronic device of claim 9, wherein the types of disruptions correlate to values of a scale of the quality score.

12. The electronic device of claim 9, wherein the disruption score is based on multiple types of disruptions.

13. The electronic device of claim 9, wherein information about the types of disruptions comprise a category, a disruption score, an audio filtering technique applied, or a combination thereof.

14. The non-transitory machine-readable medium of claim 1, wherein the processor is to:

determine a perceived severity of the audio event based on at least one of an amplitude of the audio event relative to an amplitude of the audio signal before and after the audio event, a duration of the audio event relative to a duration of the time period, or a number of past occurrences of equivalent audio events during the time period.

15. The non-transitory machine-readable medium of claim 14, wherein the processor is further to:

determine, for each detected audio event, a disruption category comprising at least one of minor, major, or corrected based on the perceived severity of the audio event; and assign the distinct disruption score to the audio event based on the disruption category.

16. The non-transitory machine-readable medium of claim 1, wherein each discrete audio event is a distortion of sound identified based on at least one of an amplitude or a duration of the audio event.

17. The non-transitory machine-readable medium of claim 1, wherein the processor is to, in response to processing the audio signal to compensate for the audio event, reassign the disruption score for the audio event to a post-compensation disruption score indicative of correction.

18. The non-transitory machine-readable medium of claim 1, wherein the processor is further to, in response to the disruption score exceeding a threshold for a respective audio event, process the audio signal to compensate for the respective audio event.

* * * * *